United States Patent
Shiba et al.

(10) Patent No.: US 6,326,747 B1
(45) Date of Patent: Dec. 4, 2001

(54) METHOD AND DEVICE FOR SYNCHRONIZATION CONTROL

(75) Inventors: Noriyuki Shiba, Tokyo; Keiichi Fukushima, Ebina; Takeshi Mitsuhashi, Ebina; Ikuo Kotani, Ebina, all of (JP)

(73) Assignee: Kabushiki Kaisya Tokyo Kikai Seisakusho (JP)

(*) Notice: Subject to any disclaimer, the term of this patent is extended or adjusted under 35 U.S.C. 154(b) by 0 days.

(21) Appl. No.: 09/464,890

(22) Filed: Dec. 16, 1999

(30) Foreign Application Priority Data

Dec. 21, 1998 (JP) .................................................. 10-362567

(51) Int. Cl.⁷ ....................................................... H02P 5/52
(52) U.S. Cl. ................................................. 318/85; 318/41
(58) Field of Search .................................. 318/41, 45, 49, 318/66, 68, 69, 70, 74, 77, 85, 705

(56) References Cited

U.S. PATENT DOCUMENTS

| | | | |
|---|---|---|---|
| 3,644,806 | * | 2/1972 | Belson et al. ............................. 318/7 |
| 3,718,846 | * | 2/1973 | Bejach ................................... 318/85 |
| 4,084,083 | * | 4/1978 | McNally et al. ................. 318/569 X |
| 4,829,217 | * | 5/1989 | Kameyama et al. .................... 318/51 |

FOREIGN PATENT DOCUMENTS

| | | |
|---|---|---|
| 59-117489 | 6/1984 | (JP) . |
| 62-122987 | 6/1987 | (JP) . |
| 05-056684 | 3/1993 | (JP) . |
| 10-032992 | 2/1998 | (JP) . |
| 10-114058 | 5/1998 | (JP) . |

* cited by examiner

Primary Examiner—Bentsu Ro
(74) Attorney, Agent, or Firm—Bierman, Muserlian and Lucas

(57) ABSTRACT

A synchronization control device and a synchronization control method are provided in which it includes controllers Am and As1 of a master section and a slave section for accurately synchronizing rotational frequency and rotation phases of driving electric motors Mm and Ms1. The controller As1 includes rotational frequency detectors Ss1, Fs1, a master phase counter Cm1, and a slave phase counter Cs1, and detects at all times both of a rotational frequency and a rotation phase of the electric motors Mm of the master based upon an output of the rotary encoder Pm, and further detects at all times both of a rotational frequency and a rotation phase of the electric motor Ms1 of the slave. A phase deviation calculator Hs1 is provided to calculate synchronization phase deviation at all times, and when a switch RYs1 is actuated, it corrects an output of the rotational frequency detection means Ss1 based upon the phase deviation and matches origins of the electric motors of the master section and the slave section to shift the operation to synchronization control.

4 Claims, 4 Drawing Sheets

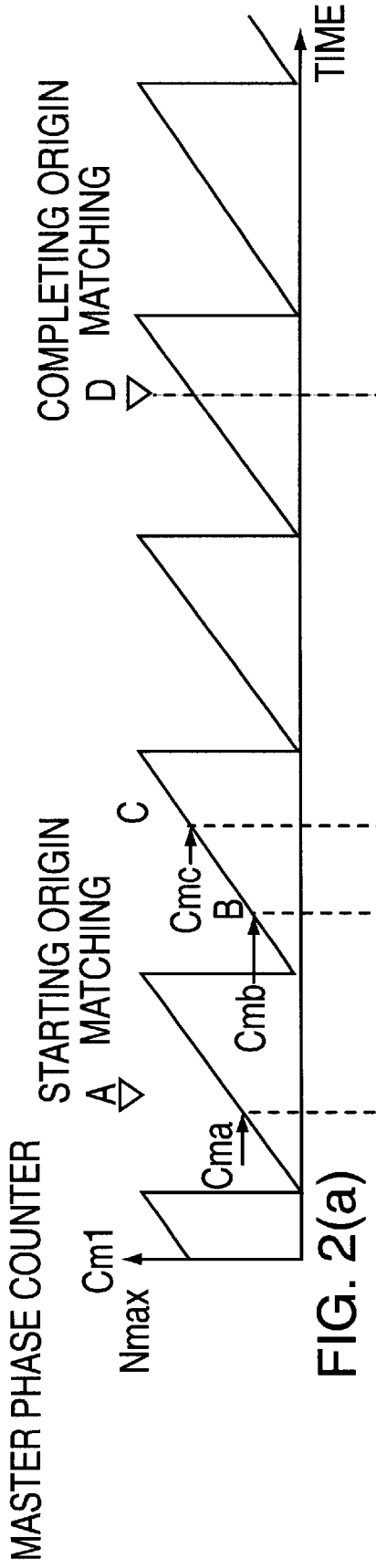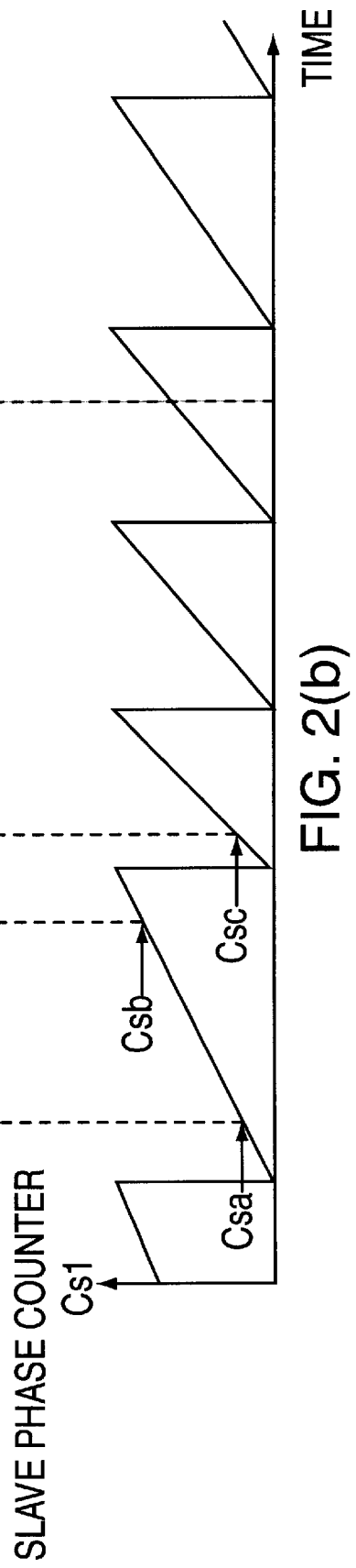
FIG. 2(a)
FIG. 2(b)

METHOD AND DEVICE FOR SYNCHRONIZATION CONTROL

BACKGROUND OF THE INVENTION

1. Field of the Invention

The present invention relates to a device and a method for controlling synchronization where machine shafts are electrically-driven and in phased synchronism by plural, mutually accurate, electric motors. Such shafts may be found in conveyor systems, processing systems for resins and metals, and rotary presses.

2. Background of the Invention

When synchronization control is effected by electrically keeping mutual phases of plural electric motors (or mechanical shafts driven by those electric motors) unchanged, it is necessary to first match the "origins" (or starting points or reference points) of those electric motors or mechanical shafts, and then effect synchronization control.

For matching origins, a conventional method uses an origin detector provided on each electric motor or each rotating machine shaft to detect a machine origin. The electric motor is then interrupted, and the origins of all other electric motors are then detected. When detection of all origins for all motors is complete, synchronous operation is begun. In this way, a time of 30 to 50 seconds is required until the matching has been completed. This lengthens waiting time, causing poor working efficiency.

To solve such a difficulty, a recently proposed method matches the origins of plural electric motors in an improved manner, i.e., the matching of origins is achieved without once interrupting the electric motors during low rotational frequency operation.

FIG. 6 illustrates a prior art example in which matching of origins is effected during low rotational frequency operation of electric motors. In FIG. 6, two electric motors are exemplarily used in the matching of origins of plural electric motors for brevity of the description.

In FIG. 6, Mm, Ms1 are electric motors in a master section and a slave section, Pm, Ps1 are incremental encoders each coupled with the machine shafts driven by the electric motors, and Rm, Rs1 are the rotating machine shafts driven by the electric motors. Machine origins Gm, Gs1 are mounted on the machine shafts Rm, Rs1, which origins are detected by detectors Km, Ks1. The aforementioned master and slave electric motors Mm, Ms1 are driven respectively by drivers Dm, Ds1 and controllers Am, As1.

The aforesaid controller Am drives the electric motor Mm through the driver Dm following a rotational frequency instruction provided from a concentrated controller C by obtaining a rotational frequency signal through a rotational frequency detector Fm from a continuous pulse signal outputted by the aforementioned incremental encoder Pm, and feeding the rotational frequency signal back.

In the following discussion, the arrangement of the aforementioned controller As1 of the slave section in FIG. 6 will be described.

In the controller As1 a rotational frequency instruction is detected by the rotational frequency detector Ss1 from the pulse signal obtained from the aforementioned incremental encoder Pm of the master section. Further, a feedback rotational frequency of the slave section is detected from the incremental encoder Ps1 and the rotational frequency detector Fs1 of the slave section.

Herein, a cumulative counter Cs1 is cleared when the aforesaid detector Km of the master section detects the machine origin, and counts a pulse train of the aforesaid incremental encoder Ps1 of the slave section.

The counted value of the cumulative counter Cs1 is stored in a Z correlation distance memory area Zs1 with the aid of a switch RYs1, actuated when the detector Ks1 of the slave section detects the machine origin. More specifically, the stored value in the Z correlation distance memory part Zs1 indicates a Z correlation distance $\Delta\theta$ obtained by measuring the phase difference of the mechanical origins of the master and the slave with the number of pulses of the aforesaid Ps1 of the slave section.

When the origins are matched, two electric motors are actuated and run at a low rotational frequency with a rotational frequency instruction of the aforesaid centralized controller C. In the slave section, the z correlation distance $\Delta\theta$ is read out from the z correlation Zs1 in the operation at the low rotational frequency, and $\Delta\theta/\Delta T$ is calculated in order to adjust the time $\Delta T$ and a correction value of the $\Delta\theta/\Delta T$ is subtracted from the rotational frequency instruction by the aforesaid rotational frequency detector Ss1 of the slave section. The correction is executed for the time $\Delta T$ with the switch RYs2.

Two electric motors are matched in origins thereof by adjusting the rotational frequency of the slave section as described above, and are changed over to synchronization control and then accelerated into ordinary rotational frequency operation.

The prior art method and apparatus however suffer from difficulties that even when the origin matching is effected while operating the electric motors, the Z correlation distance $\Delta\theta$ is detected by allowing the electric motors of the master and slave to rotate by one revolution or more, so that much time is required for the detection, and it takes 20 to 40 seconds until the origin matching is completed.

Further, in order to detect the Z correlation distance $\Delta\theta$ it is needed that the rotational frequency of the master and slave electric motors are stabilized and they are operated at the same rotational frequency to the utmost, so that the origin matching must be done at a low rotational frequency, which causes a complicated adjustment.

Furthermore, when there are electric motors under operation and electric motors under interruption and the electric motors under interruption are started for synchronization control, the electric motors already in operation must be operated once at a low rotational frequency for the origin matching, and hence an operation procedure is complicated and much time is required.

SUMMARY OF THE INVENTION

It is an object of the present invention to provide a synchronization control device and a synchronization control method in which it is capable of achieving origin matching in a short time continuously in operation of the electric motors without once interrupting the electric motors whether they are operated at low rotational frequency or normal rotational frequency and is capable of shifting the operation to ordinary synchronization operation, and in which it is capable of, even when synchronization operations for electric motors are performed in ordinary operation and for stopped electric motors, starting the stopped electric motors to achieve origin matching in the operation of the electric motors to continuously shift the operation to ordinary synchronization operation without bringing the electric motors in operation into a low rotational frequency.

According to the present invention, for synchronization control of machine shafts driven by electric motors, one electric motor is disposed in a master section and the other one or plural electric motors is or are disposed in a slave section. A rotary encoder composed of an absolute encoder or an incremental encoder with a Z phase pulse is provided on the electric motors of the master section and the slave section or on machine shafts driven by the electric motors to output a signal in response to rotation of the electric motor or the machine shaft. For the aforesaid rotary encoder there may be employed one attached to each electric motor (rotary encoder mounted on the electric motor for detecting rotation of the electric motor), and the rotary encoder may be coupled with a machine shaft connected with a rotary shaft of each electric motor or coupled with a machine shaft connect through a gear and the like.

The electric motor of the master section is driven by ordinary rotational frequency control. A controller of the electric motor of the slave section detects at all times both a rotational frequency and a rotation phase of the aforesaid electric motor or the machine shaft based upon a signal from the rotary encoder of the master section, and detects at all times both a rotational frequency and a rotation phase of the electric motor of the slave or the machine shaft driven by the electric motor based upon a signal from the rotary encoder of the slave section.

The controller of the electric motor of the slave section calculates at all times a synchronization phase deviation from the rotation phase of the master and it of the slave both detected at all times as described above.

In the synchronization control device constructed as described above, when plural electric motors are all operated from a stopped state, they are increased in their rotational frequency first from a low rotational frequency to a predetermined rotational frequency irrespective of an ordinary rotational frequency. The electric motor of the master section is increased in its rotational frequency with ordinary rotational frequency control, and the electric motor of the slave section or the machine shaft driven by the electric motor is increased in its rotational frequency taking a signal detected from the rotary encoder of the master section as a rotational frequency instruction.

After the electric motor of each slave section is in acceleration or reaches a predetermined rotational frequency, the synchronization phase deviation of the master and the slave calculated at all times is added to the rotational frequency instruction as a correction value. Each slave section rapidly completes the origin matching as described above.

Each slave section adds at all times the synchronization phase deviation of the master and slave sections to the rotational frequency instruction as a correction value even after the origin matching is completed, and clearly continues the synchronization control with the same action as the origin matching even under ordinary operation on and after the operation.

Although in the above description the electric motor is provided on the master section, and a rotational frequency signal and a phase signal are outputted from the rotary encoder attached to the electric motor provided on the master section or coupled with the machine shaft driven by the electric motor, a rotational frequency signal and a phase signal corresponding to the signal outputted from the aforesaid rotary encoder are electronically generated without provision of the electric motor on the master section and are outputted from the master section, and the rotation phase of the electric motor of the slave section or of the machine shaft driven by the electric motor may be controlled on the basis of the rotational frequency signal and the phase signal.

In the present invention, as described above, the synchronization phase deviation of the master and the slave is detected at all times, which deviation is in turn employed as a correction signal to rapidly complete the origin matching and eliminate the need of a changeover of the control upon the origin matching and in transfer to ordinary synchronization control and hence bring very high practicability.

According to the present invention, when plural electric motors are operated from an all-stopped state, the origin matching is clearly ensured even in acceleration without waiting arrival to a predetermined rotational frequency.

Further, according to the present invention, in plural electric motors in operation at an ordinary rotational frequency and the electric motors of the slave section out of operation, in order that the origin matching of the stopped electric motors is effected to add those electric motors to the synchronization control, the stopped electric motors of the slave section are started, and the rotational frequency of the master section detected from the rotary encoder of the master section is increased as the rotational frequency instruction. The slave section, after reaching a predetermined rotational frequency, adds the synchronization phase deviation of the slave and the master to the rotational frequency instruction as a correction. The slave section rapidly completes the original point matching and shifts the operation to the synchronization control.

BRIEF DESCRIPTION OF THE DRAWINGS

The above and other objects, features and advantages of the present invention will become more apparent from the following description when taken in conjunction with the accompanying drawings in which preferred embodiments of the present invention are shown by way of illustrative example.

FIG. 2(a) and FIG. 2(b) are a view illustrating detection of phase deviation among plural electric motors;

DETAILED DESCRIPTION OF THE PREFERRED EMBODIMENT

Figure 1:
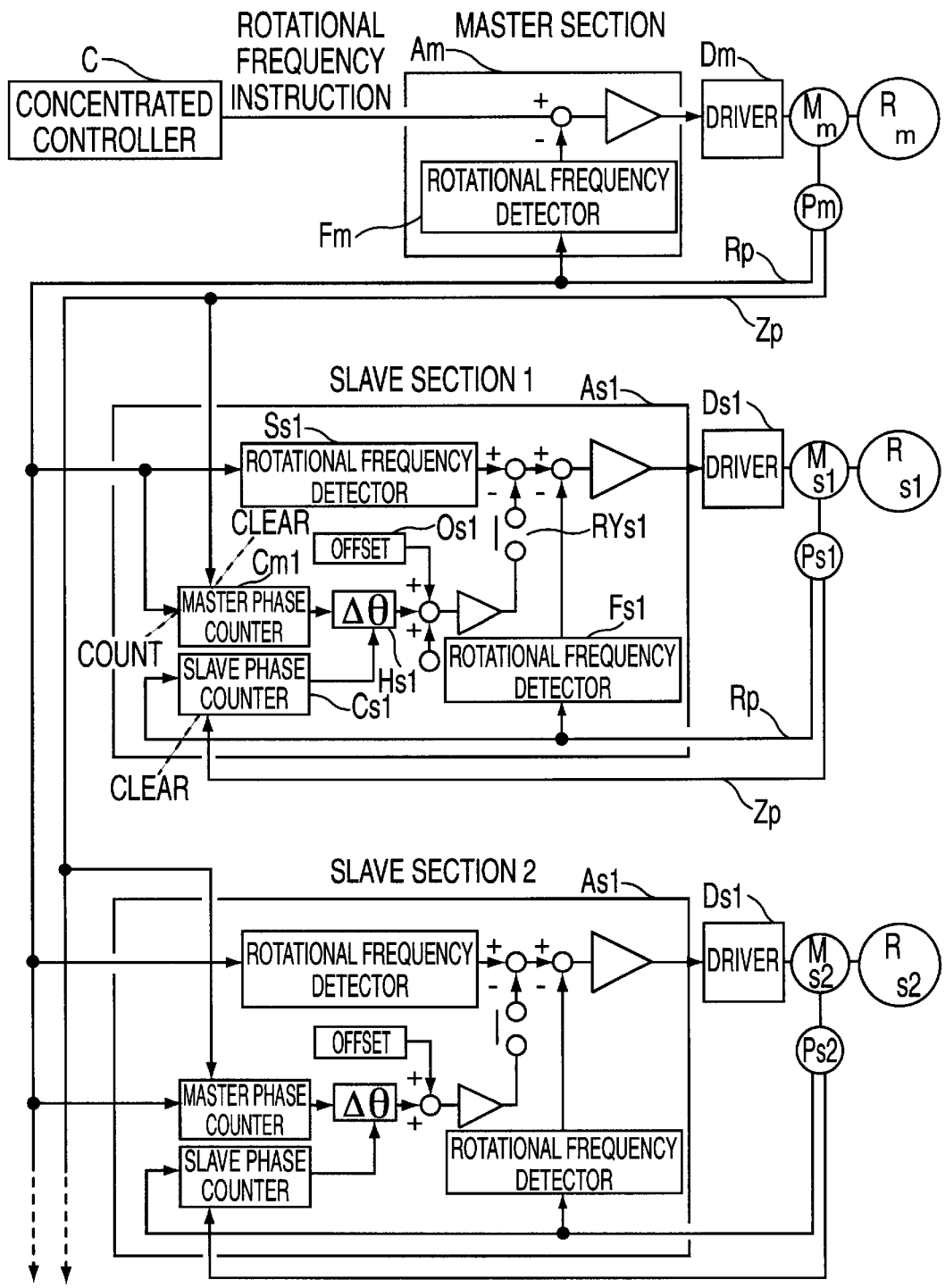
FIG. 1 is a view illustrating a preferred embodiment of matching an origin according to the present invention.

In the following, preferred embodiments will be described in detail with reference to the accompanying drawings. FIG. 1 illustrates a preferred embodiment of the present invention where plural electric motors are matched in origins thereof, FIGS. 2, 3, 4, and 5 are views each illustrating operation of a preferred embodiment illustrated in FIG. 1.

Figure 6:
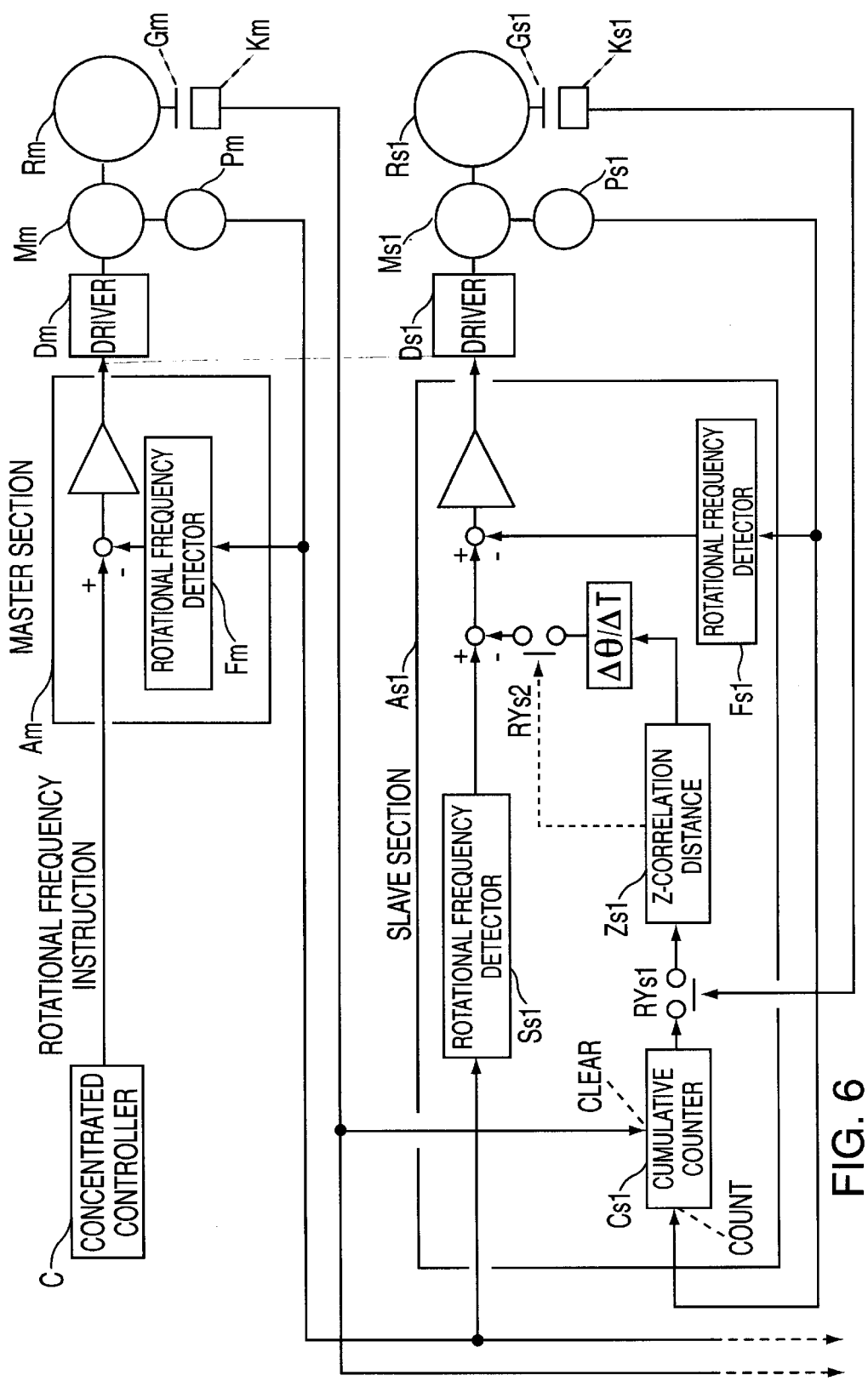
FIG. 6 is a view illustrating a prior art example wherein origin matching is effected for synchronization control.

FIG. 1 exemplarily illustrates synchronization control of a master section and two slave sections in order to simply describe plural electric motors according to the present invention, in which the same symbols shall be applied to portions overlapping on portions in FIG. 6 illustrating a prior art example.

In FIG. 1, Mm is an electric motor of the master section, Ms1, Ms2 are electric motors of the slave section, respectively, and Pm, Ps1, Ps2 are incremental encoders coupled with the aforesaid electric motors. For the rotary encoders coupled with the electric motors of the master section and the slave section 1, 2, there is available an absolute encoder or an incremental encoder with a Z phase pulse. In the embodiment in FIG. 1, there is illustrated an example where there are used incremental encoders with a Z phase pulse Pm, Ps1, Ps2, in which controllers Am, As1 of the electric motors receive a Z phase pulse Zp once for one revolution of the electric motor and a pulse series Rp in response to the rotation of the electric motor from the incremental encoders Pm, Ps1, Ps2.

Although in the present embodiment, there is described the case where the rotary encoder is additionally provided on the electric motor, a rotary encoder may be coupled with a machine shaft connected with the electric motor through a gear and the like.

The controller Am of the master section obtains a rotational frequency signal from a continuous pulse series Rp outputted from the incremental encoder Pm with a rotational frequency detector Fm, and feeds back the rotational frequency signal to control the operation such that the rotational frequency of the aforesaid electric motor Mm is coincident with a rotational frequency instruction provided from the concentrated controller C.

The aforesaid controller As1 of the slave sections 1, 2 detects a rotational frequency instruction from the pulse signal obtained from the incremental encoder Pm with the aid of the rotational frequency detector Ss1, and further detects a feedback rotational frequency of the slave section from the incremental encoders Ps1, Ps2 of the slave section with the aid of the rotational frequency detector Fs1 and controls the operation such that the rotational frequency of the electric motor Ms1 is coincident with that of the electric motor Mm.

The master phase counter Cm1 of the controller As1 of the slave sections 1, 2 counts the pulse series Rp from the incremental encoder Pm of the master section and is cleared with the Z phase pulse Zp, whereby the rotation phase of the electric motor Mm of the master section is detected at all times.

Simultaneously, the slave phase counter Cs1 counts the pulse series Rp of the incremental encoder Ps1 of the slave section and is cleared with the Z phase pulse Zp, whereby the rotation phases of the electric motors Ms1, Ms2 of the slave section are detected at all times.

Counted values of the phase counters Cm1 and Cs1 are inputted into the phase deviation calculator Hs1 in which the phase deviation $\Delta\theta$ calculated. The phase deviation $\Delta\theta$ is held in the phase deviation calculator Hs1 at all times, and when the contact PYs1 is closed as in the case where origins are matched or synchronization is controlled, a rotational frequency instruction detected by the rotational frequency detector Ss1 is corrected with an output of the phase deviation calculator Hs1.

Further, an offset signal outputted from an offset signal generator Os1 is added to the output of the phase deviation calculator Hs1, whereby predetermined offset is provided between rotation phases of the electric motor Mm of the master section and them of the electric motor Ms1 of the slave section.

FIG. 2 is a view further illustrating the operations of the master phase counter Cm1 and the slave phase counter Cs1.

FIG. 2(a) illustrates operation of the master phase counter Cm1, and FIG. 2(b) illustrates operation of the slave phase counter Cs1.

As illustrated in the same figure, the master phase counter Cm1 is cleared with the Z phase pulse Zp of the incremental encoder Pm of the master section, and counts the pulse series Rp in response to the rotation of the incremental encoder Pm. As clarified from this, the master phase counter Cm1 detects the rotation phase of the electric motor of the master section.

Likewise, the slave phase counter Cs1 is cleared with the Z phase pulse Zp of the incremental encoder Ps1 of the slave section, and counts the pulse series Rp in response to the rotation from the incremental encoder Ps1 to hereby detect the rotating phase of the electric motor of the slave section.

Outputs of the master phase counter Cm1 and slave phase counter Cs1 are inputted into the phase deviation calculator Hs1, and the phase deviation calculator Hs1 calculates a phase deviation Hs in accordance with the following formula:

$$Hs = N\max \times Covf + Cm - Cs \qquad (1)$$

In the formula (1), Nmax is a pulse number for one revolution of the incremental encoders with a Z phase pulse Pm, Ps1, and Covf is a counted value of overflow pulses of the master phase counter Cm1 and the slave phase counter Cs1 which value is added one by one every time the master phase counter Cm1 overflows and is subtracted one by one every time the slave phase counter Cs1 overflows. Cm and Cs are count values of the master phase counter Cm1 and the slave phase counter Cs1.

Once the electric motors Mm, Ms1 of the master and slave sections are driven, the aforesaid phase counters Cm1 and Cs1 are operated as illustrated in FIG. 2.

First, at the instant of the operation "original matching input" at time point A in FIG. 2 the aforesaid counted value Covf is cleared. At the time point, Covf=0, and the phase deviation Hs is calculated from the following formula:

$$Hs = Cm - Cs \qquad (2).$$

Then, at a point B the master phase counter Cm1 overflows, so that Cof=1 is attained, and hence the phase deviation Hs at the point B is calculated from the following formula:

$$Hs = N\max \times 1 + Cm - Cs \qquad (3)$$

Then, since at a point C the slave phase counter Cs1 is overflowed, Covf=0 holds, and the phase deviation Hs at the point C is obtained with the following formula:

$$Hs = N\max \times 0 + Cm - Cs \qquad (4)$$

Figure 3:
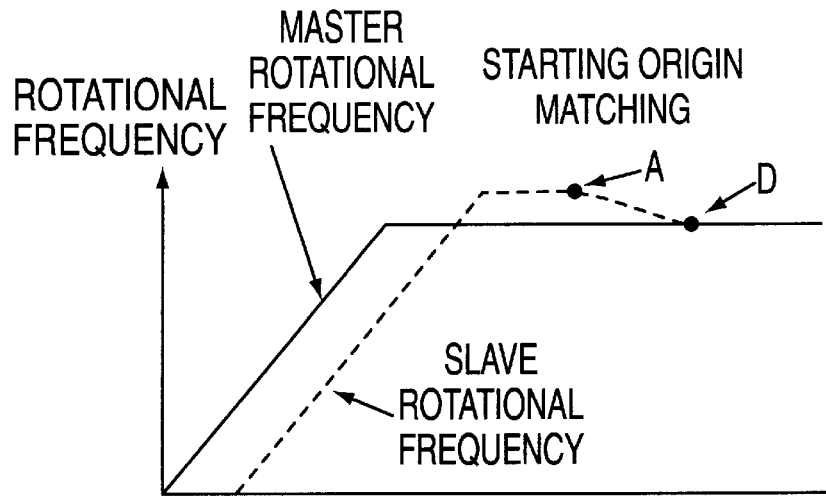
FIG. 3 is a view illustrating operation when plural stopped electric motors are started, and origin matching is effected after completion of acceleration according to the present invention.

Matching of the slave section with the master section in their original points is realized by calculating the phase deviation Hs, and subtracting the phase deviation Hs from a rotational frequency instruction outputted by the rotational frequency detector Ss1 as described above, and hence the original point matching at a point D illustrated in FIG. 3 is completed.

FIG. 3 is a view illustrating the operation of the origin matching where plural electric motors start their operations from all interrupted state. Once the operation is started, the electric motors of the master section and the electric motors of the slave section are accelerated up to arbitrary rotational frequency with an ordinary rotational frequency instruction.

When the contact RYs1 is closed at the point A where the rotational frequency is kept unchanged, the rotational frequency instruction detected by the rotational frequency detector Ss1 is corrected with the output of the phase deviation calculator Hs1, and the origin matching is completed at the point D where the phase deviation Hs becomes zero.

Figure 4:
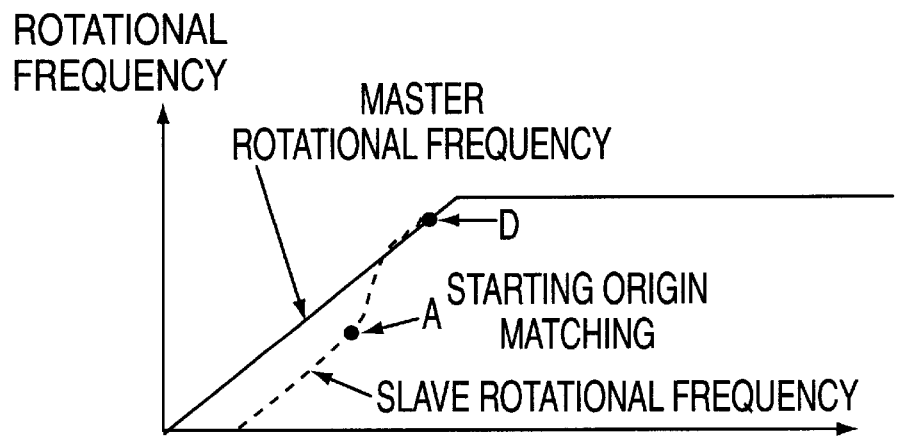
FIG. 4 is a view illustrating the operation when plural stopped electric motors are started, and the origin matching is effected in acceleration according to the present invention.

FIG. 4 is a view illustrating operation where plural electric motors start their operations from all interruption state and the origin matching is performed during acceleration. Once the operation is started, the contact RYs1 is closed during the acceleration, and a rotational frequency instruction detected by the rotational frequency detector Ss1 is corrected with an output of the phase deviation calculator Hs1, and likewise the origin matching is completed.

Figure 5:
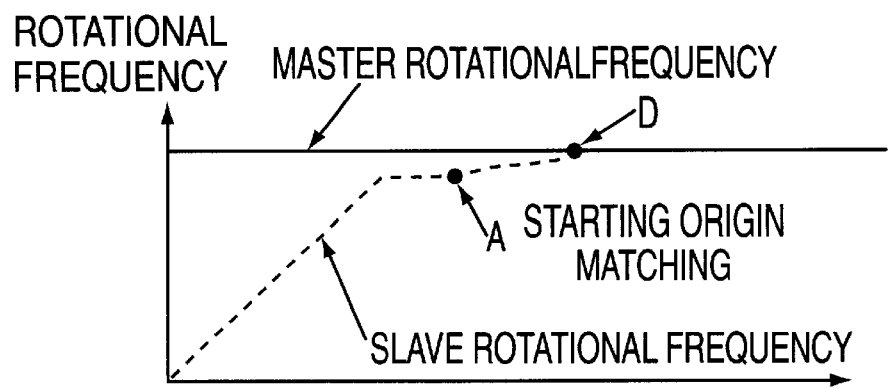
FIG. 5 is a view illustrating the operation when plural stopped electric motors are started, and the origin matching is effected for other electric motors in operation according to the present invention.

FIG. 5 is a view illustrating the operation of the present embodiment wherein there are electric motors in operation and stopped electric motors among plural electric motors, and the stopped electric motors start their operation to be accelerated up to the rotational frequency of the electric motors in operation, and after completion of the acceleration the origin matching is performed. The slave section starting its operation anew is accelerated up to substantially same rotational frequency as that of the section already in operation, and thereafter the origin matching is started at the point A as described previously. The origin matching is achieved with the aid of the action of the aforesaid phase deviation Hs, and the origin matching is completed at the point D where the phase deviation Hs becomes 0.

Although in the present preferred embodiment illustrated in FIG. 1 there was described the situation where the electric motors are provided in the master section, and where there was performed the synchronization control between machine shafts driven by the electric motors and machine shafts driven by the electric motors provided in the slave section, there may be provided in the concentrated controller C means for electronically generating a rotational frequency signal outputted from the incremental encoder Pm and a signal corresponding to the phase signal as described previously, which concentrated controller C may be operated as the master section.

More specifically, signals corresponding to the rotational frequency signal and the phase signal are electronically generated in the concentrated controller C, which signals are in turn provided to the master phase counter Cm1 of the slave section as described in the aforesaid preferred embodiment, whereby the signals corresponding to the rotational frequency signal and the phase signal can be synchronized with the machine shaft of the electric motor of the slave section.

What is claimed is:

1. A synchronization controller including controllers of a master section and at least one slave section, each for controlling an electric motor, said synchronization controller serving to accurately synchronize a rotational frequency and a rotation phase of each said electric motor or a machine shaft driven by each said electric motor, each said slave section controller comprising:

a master rotational frequency detector and a master phase counter for detecting simultaneously at all times a rotational frequency signal and a phase signal from an output of a rotary encoder coupled with the electric motor in the master section or from an output of a rotary encoder coupled with the machine shaft driven by said electric motor, said rotary encoder comprising an incremental encoder with a Z phase pulse, and said master phase counter operating to count the output pulses of said encoder and being cleared with said Z phase pulse;

a slave rotational frequency detector and a slave phase counter for detecting simultaneously at all times a rotational frequency signal and a phase signal from an output of a rotary encoder coupled with the electric motor in the slave section or from an output of a rotary encoder coupled with the machine shaft driven by said electric motor, said rotary encoder comprising an incremental encoder with a Z phase pulse and said slave phase counter operating to count the output pulses of said encoder and being cleared with said Z phase pulse; and a phase deviation calculator for detecting a rotational phase deviation from the outputs of said master phase counter and said slave phase counter at all times, according to counted overflow pulses and the counted output pulses of said master phase counter and said slave phase counter, there being matched an origin of the electric motor in the master section and an origin of the electric motor in the slave section, or matched an origin of the machine shaft driven by the electric motor in the master section and an origin of the machine shaft driven by the electric motor in the slave section to achieve synchronous control.

2. A synchronization controller including a controller of a slave section for controlling an electric motor, said synchronization controller serving to accurately synchronize a rotational frequency and rotation phase of said electric motor or a machine shaft driven by said electric motor with a rotational frequency signal pulses and a Z phase pulse signal electronically generated within and outputted from a master section, said slave section controller comprising:

a master rotational frequency detector and a master phase counter for simultaneously detecting the rotational frequency signal and the phase signal from an output of an incremental encoder with a Z phase pulse coupled with the electric motor in the master section or from an output of a rotary encoder coupled with the machine shaft driven by said electric motor outputted from the master section at all times, and said master phase counter operating to count the output signal pulses from said master section and being cleared with the Z phase pulse from said master section;

a slave rotational frequency detector and a slave phase counter for detecting simultaneously at all times the rotational frequency signal and the phase signal from an output of an incremental encoder with a Z phase pulse coupled with the electric motor of the slave section or from an output of an incremental encoder with a Z phase pulse coupled with the machine shaft driven by the electric motor, and said slave phase counter operating to count the output pulses of said encoder and being cleared with said Z phase pulse; and a phase deviation calculator for detecting a rotational phase deviation from the outputs of said master phase counter and said slave phase counter at all times, according to counted overflow pulses and the counted output pulses of said master phase counter and said slave phase counter, there being matched an origin of said electric motor of the slave section or the machine shaft driven by said electric motor based upon the phase deviation detected by said phase deviation calculator to synchronize rotation phase of said electric motor or the machine shaft driven by said electric motor with the signal outputted from the master section.

3. A synchronization control method including a plurality of electric motors, each for driving at least one rotating machine shaft and a controller for a master section and at least one slave section, each said controller for controlling one of said electric motors, said synchronization control method serving to accurately synchronize a rotational frequency and rotation phase of each said electric motor or the machine shaft driven by each said electric motor, comprising the steps of:

when all of said electric motors start their operations from a stopped state, simultaneously detecting at all times a rotational frequency signal and a phase signal from an output of an incremental rotary encoder with a Z phase pulse coupled with the electric motor in the master section or of a machine shaft driven by said electric motor and further simultaneously detecting at all times a rotational frequency signal and a phase signal from an output of an incremental rotary encoder with a Z phase pulse coupled with of the electric motor of in the slave section or of the machine shaft driven by the said electric motor;

calculating a rotational phase deviation from said rotational frequency signal and said phase signal according to counted overflow pulses and counted output pulses of a master phase counter and a slave phase counter; and matching origins of said electric motors of in each slave section or of the machine shafts driven by said electric motors based upon said phase deviation during acceleration of all number of the electric motors or after all number of said electric motors reach a predetermined rotational frequency, and synchronizing the rotation phase of said electric motors or of the machine shafts driven by said electric motors with the phase signal outputted from the master section.

4. A synchronization control method including a plurality of electric motors, each for driving at least one rotating machine shaft and a controller for each of a master section and a slave section, each controller for controlling one of said electric motors, said synchronization control method serving to accurately synchronize a rotational frequency and rotation phase of each said electric motor or the machine shaft driven by each said electric motor, comprising the steps of:

when some of said electric motors are in operation and others of said electric motors are under interruption and the operation of the electric motors under interruption is started, simultaneously detecting rotational frequency signals and phase signals from an output of an incremental rotary encoder with a Z phase pulse coupled with the electric motor in the master section or the machine shaft driven by said electric motor at all times and further simultaneously detecting the rotational frequency signals and the phase signals from an output of an incremental rotary encoder with a Z phase pulse coupled with the electric motor in each slave section or of the machine shaft driven by each said electric motor at all times;

calculating a rotational phase deviation from said rotational frequency signals and said phase signals according to counted overflow pulses and counted output pulses of a master phase counter and a slave phase counter; and matching origins of said electric motors in each slave section or of the machine shafts driven by said electric motors based upon said phase deviation after said electric motors reach a predetermined rotational frequency to synchronize the rotation phase of said electric motors or of the machine shafts driven by said electric motors with the phase signal outputted from the master section.

* * * * *